E. U. G. REAGAN.
COMBINED ELASTIC CLUTCH AND ENGINE STARTER.
APPLICATION FILED AUG. 26, 1910.
1,024,099.
Patented Apr. 23, 1912.
2 SHEETS—SHEET 2.
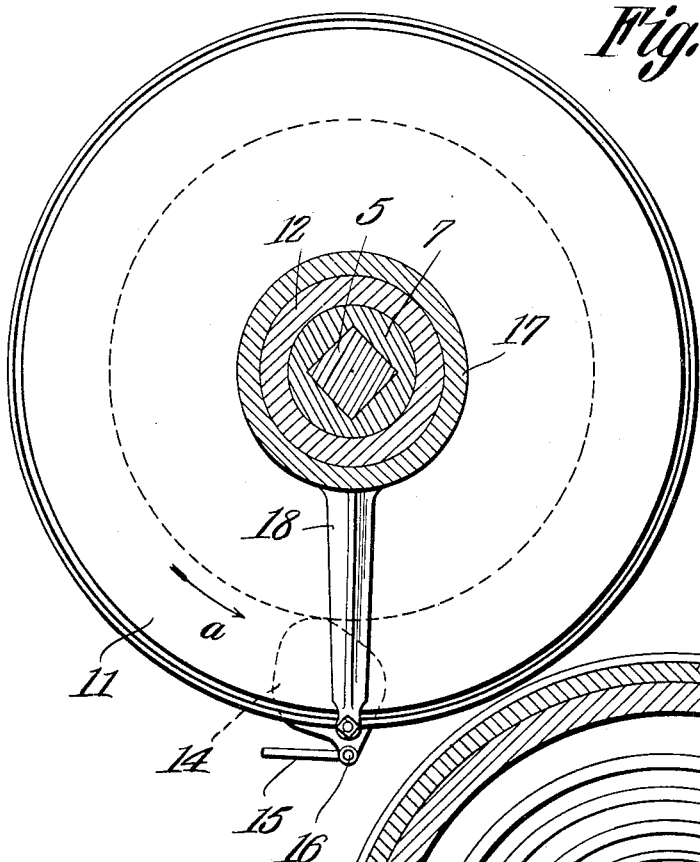
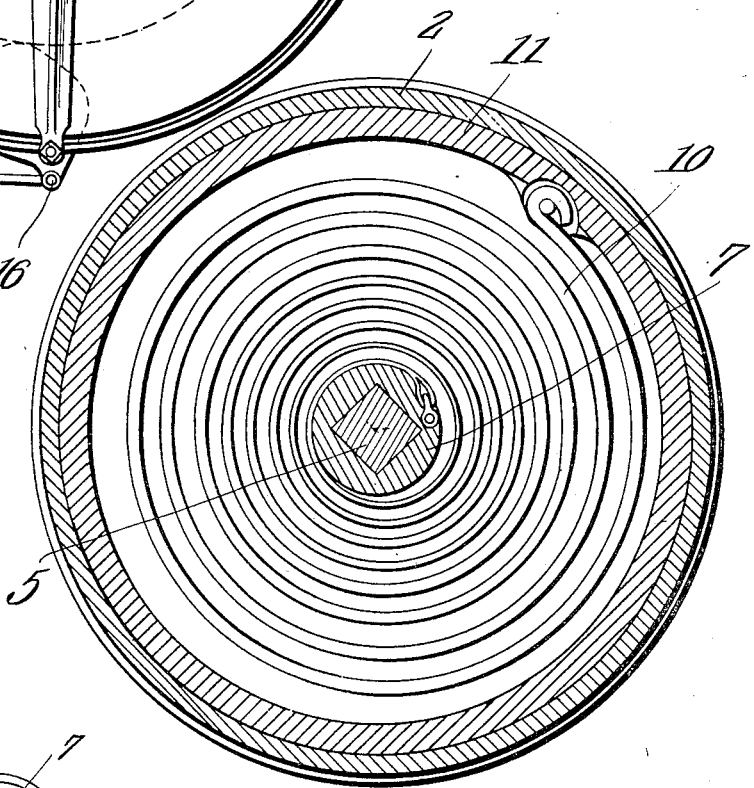
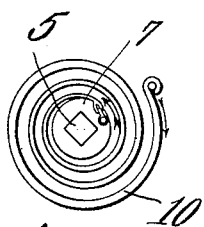
Witnesses
Frank B. Wooden.
Herbert D. Lawson
Edgar U. G. Reagan
Inventor,
by C. A. Snow & Co.
Attorneys.

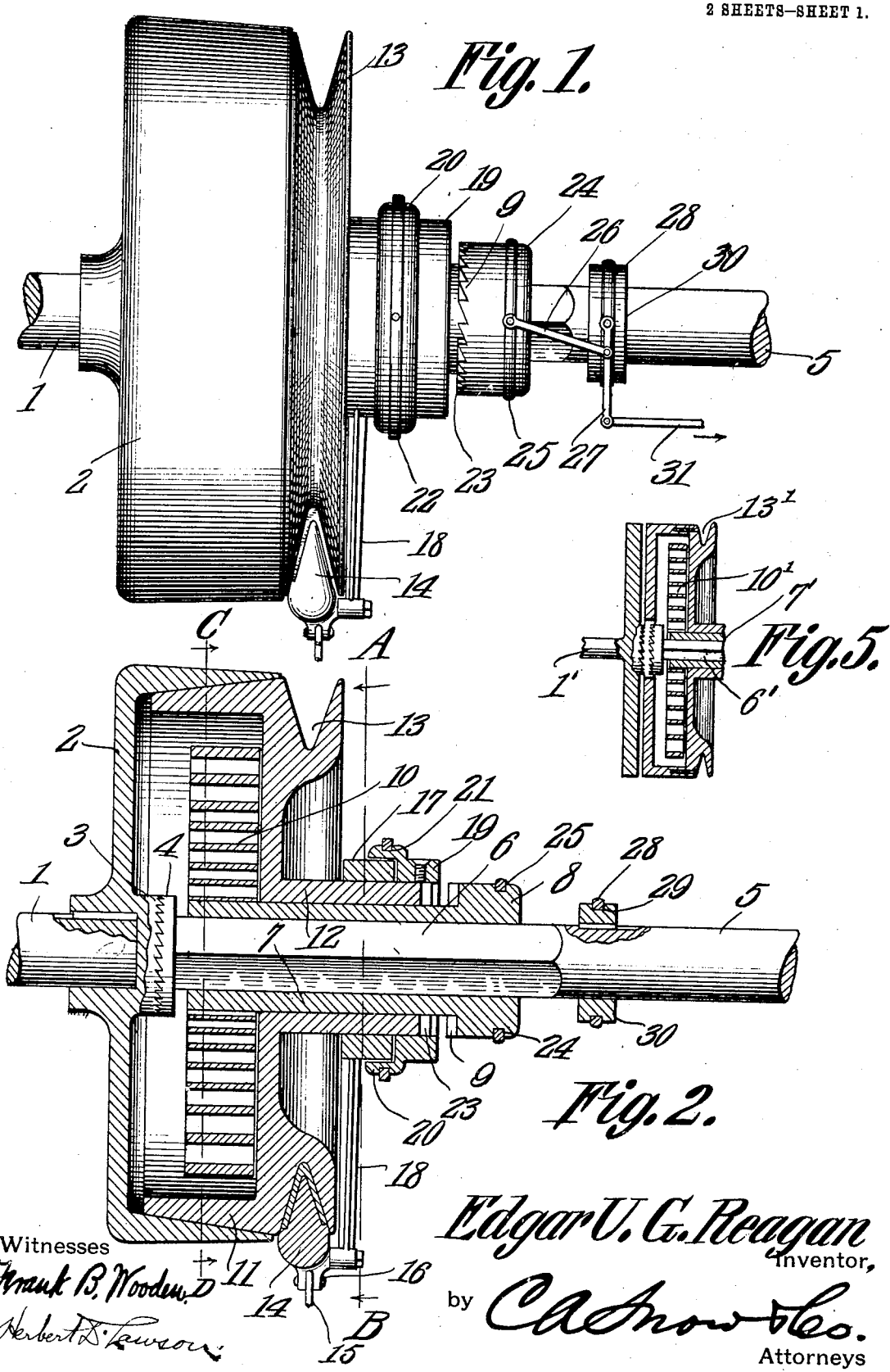

UNITED STATES PATENT OFFICE.

EDGAR U. G. REAGAN, OF SAN ANTONIO, TEXAS, ASSIGNOR TO REAGAN CLUTCH COMPANY, OF SAN ANTONIO, TEXAS, A CORPORATION.

COMBINED ELASTIC CLUTCH AND ENGINE-STARTER.

1,024,099. Specification of Letters Patent. Patented Apr. 23, 1912.

Application filed August 26, 1910. Serial No. 579,063.

*To all whom it may concern:*

Be it known that I, EDGAR U. G. REAGAN, a citizen of the United States, residing at San Antonio, in the county of Bexar and State of Texas, have invented a new and useful Combined Elastic Clutch and Engine-Starter, of which the following is a specification.

This invention relates to a combined elastic clutch and engine starter, one of its objects being to provide means whereby the driving shaft of a hydro-carbon engine may be automatically started by the release of a spring or the like in which energy is adapted to be stored by the relative movements of the friction members of the clutch during the initial transmission of power from the engine to the driven shaft.

A further object is to provide separate means for holding one end of the spring against movement during the starting or cranking of the motor and for holding the other end of the spring during the resetting or recharging of the spring.

Another object is to provide a clutch having means whereby the transmission of power from the motor to the driven shaft will be gradual and thus eliminate the sudden jerking which is commonly produced during the starting of a machine actuated by a hydro-carbon engine and which is so harmful to the driven parts.

Another object is to provide a novel form of spring by means of which power will be instantaneously but gradually applied to either of the elements actuated by the spring.

A further object is to provide simple means whereby the clutch will be constantly under the perfect control of the operator.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings, the preferred forms of the invention have been shown.

In said drawings:—Figure 1 is an elevation of the combined clutch and starter and showing the positions of the parts during the transmission of power from the engine shaft to the driven shaft and while energy is stored within the starting spring. Fig. 2 is a central longitudinal section through the structure, the two shafts being shown partly in section and partly in elevation and the various parts being illustrated in the positions assumed by them during the starting of the engine shaft. Fig. 3 is a section on line A—B, Fig. 2. Fig. 4 is a section on line C—D, Fig. 2. Fig. 5 is a view similar to Fig. 2 and showing the improvements applied to a disk clutch. Fig. 6 is a view showing diagrammatically, the directions of force exerted by the spring.

Referring to the figures by characters of reference 1 designates the shaft of a hydrocarbon engine, and keyed or otherwise fixedly connected to this shaft is the female member of a conical friction clutch said member being indicated at 2. A toothed clutch member 3 is centrally located within the member 2 and is preferably formed integral therewith, the teeth on this member being similar to ordinary ratchet teeth and being adapted to engage corresponding teeth formed upon a clutch member 4. This last mentioned member is integral with or secured to one end of a driven shaft 5, said shaft being angular for a portion of its length as indicated at 6 and being slidably engaged by a sleeve 7, adapted to rotate therewith. A head 8 is located at one end of this sleeve and has an annular series of clutch teeth 9 upon one face thereof and extending around the sleeve 7.

A coiled spring 10 is secured at one end to the sleeve 7 and its other end is attached, in any suitable manner, to the inner face of the annular portion of a conical clutch member 11 adapted to work into and frictionally engage the member 2. This conical member has a central tubular boss or extension 12 slidably mounted on the sleeve 7 and adapted to freely rotate thereon and that portion of the member 11 which projects beyond the member 2, has an annular V-shaped groove or channel 13. This channel receives a cam 14 which is connected, by means of a rod 15 or the like, to a stationary structure, not shown, located adjacent the clutch, it being understood that the cam is pivotally connected to the rod, as shown at 16. A ring 17 is loosely mounted on the extension 12 and has a radial arm 18 to which the cam 14 is pivotally connected. It is to be understood that cam 14 acts as a friction pawl for the purpose of preventing the clutch member 11 from rotating in one direction although permitting the same to freely rotate in the other direction. This will be obvious by referring to Fig. 3 of the drawings. When the member 11 rotates in the direction of arrow $a$ it will, obviously, frictionally engage the pawl of cam 14 and be held thereby, whereas, should the said member 11 be rotated in the opposite direction the friction pawl or cam will be automatically disengaged therefrom and said clutch member 11 permitted to rotate without hindrance.

A collar 19 is secured to the extension 12 and has an annular flange 20 overhanging the ring 17, this flange being formed with an annular groove 21 in which is loosely mounted a ring 22 adapted to be operated by a suitable lever, not shown. Extension 12 has a clutch face 23 corresponding with the face formed by the teeth 9 on head 8 and adapted to engage said teeth under certain conditions.

An annular groove 24 is formed in the head 8 and has a ring 25 loosely mounted therein. This ring is connected, by a link 26, to a lever 27 one end of which is pivotally mounted on a ring 28 which is mounted loosely in a groove 29 formed within a collar 30 which is keyed or otherwise fixedly connected to the shaft 5 and may be operated in any suitable manner so as to actuate the shaft and the parts connected thereto.

It is to be understood that under normal conditions and while the motor shaft 1 is at rest, the clutch face 23 is in engagement with the teeth 9 and, as the spring 10 is under stress, it tends to rotate the sleeve 7 and the extension 12 in opposite directions. This, however is prevented because the teeth 9 and the teeth on the clutch face 23 work against each other and it will be apparent therefore that the spring will be maintained under stress as long as the parts are thus positioned.

When it is desired to start the hydro-carbon engine, fuel is first directed thereto and the rod 31 is then shifted in the direction indicated by the arrow in Fig. 1. As the two clutch faces 23 and 9 are held tightly in frictional engagement with each other by the spring 10 under stress, it will be apparent that such movement of the rod 31 will cause the lever 27 to swing with the link 26 as its fulcrum, thus pushing the shaft 5 longitudinally and bringing its clutch 4 into engagement with the toothed clutch 3. Immediately subsequent to the completion of this movement of shaft 5, the further actuation of lever 27 will result in the pulling of link 26 and the disengagement of teeth 9 from clutch 23. As the sleeve 7 is thus released from the extension 12 the spring is also released and free to unwind. The two ends of the spring naturally tend to move in opposite directions but, as the member 11 is held against rotation in one direction by the friction pawl 14, only the sleeve 7 will be rotated by the spring. As this sleeve is mounted to rotate with the shaft 5, it will be apparent that said shaft will be revolved therewith and the clutches 4 and 3 will coöperate to rotate the member 2 and the shaft 1 and thus start the engine. As the engine picks up, the teeth on the clutch 3 will slip over the teeth on clutch 4 and shift the shaft 5 longitudinally so as to disengage the two clutch members 3 and 4. When it is desired to transmit motion from the shaft 1 to the shaft 5, the member 11 is shifted by means of the ring 22 so as to frictionally engage the member 2. As spring 10 is secured at its ends to the member 11 and to the sleeve 7 respectively, it will be apparent that this spring will first be wound by the driven member 11 and will subsequently constitute the sole means for transmitting power from the member 11 to the sleeve 7 and shaft 5. Obviously therefore, the starting of the shaft 5 is gradual because of the elastic connection between it and the members of the friction clutch and all jerking will thus be eliminated.

When the clutch member 11 is disengaged from member 2 in order to stop the rotation of the shaft 5, the clutch 23 moves into engagement with the teeth 9 and while this movement of the parts is taking place, the friction pawl 14 prevents reverse movement of the member 11 and the consequent unwinding of the spring. With the parts 7 and 12 thus locked together the engine can again be started by the tensioned spring.

While the invention has been shown in connection with a conical friction clutch it is to be understood that the same can also be used in connection with a disk clutch, such as shown, for example, in Fig. 5. In this structure the spring 10' may be housed within the movable member of the clutch and secured at one end to said member and at its other end to the sleeve 7'. In other respects the structure is similar to that heretofore described.

By referring particularly to Figs. 2 and 4 of the drawings it will be noted that the spring 10 gradually increases in thickness toward its outer end. It has been found that, when the spring is thus formed it exerts a gradual force upon the element to be actuated thereby, this force being constant during the winding of the spring and not variable as where the spring is of uniform thickness.

While the device is particularly designed for use in connection with motor vehicles it is to be understood that the same will be found advantageous wherever it is desired to operate mechanism by means of a hydrocarbon engine.

What is claimed is:—

1. Mechanism of the class described including a drive shaft, a driven shaft, a clutch member mounted for rotation independently of the driven shaft, a spring connection between said member and shaft, means for holding the ends of the spring against movement relative to each other while under stress, means for placing one of the shafts in operative relation with the other shaft and then releasing the spring ends from their fixed relation, and means for automatically holding one of the spring ends against movement.

2. Mechanism of the class described including a motor shaft, a clutch member fixed relative thereto, a driven shaft, a clutch member loose thereon, a spring connection between the driven shaft and its clutch member, means for holding said connection inactive under stress, means for releasing the spring to actuate the motor shaft, means for automatically holding one of the spring ends against movement, and means operated by the motor shaft under its own power for storing energy in said spring.

3. Mechanism of the class described including a motor shaft, a driven shaft, a clutch member mounted for rotation independently of the driven shaft, a spring connection between said member and the shaft, means for holding the ends of the spring against relative movement while under stress, clutch members upon the shafts, means for successively shifting one of the shafts into engagement with the other shaft and relasing the spring ends from their fixed relation, and means for automatically holding one of the spring ends against movement.

4. Mechanism of the class described including a motor shaft, a driven shaft, cooperating toothed clutch members upon the shaft, a friction clutch member upon the motor shaft, a friction clutch member loosely mounted upon the driven shaft, a spring connection between said loose member and the driven shaft, means for holding said connection inactive while under stress, means for successively shifting the shafts into operative relation and for releasing the connection to actuate the driven shaft, and means for shifting the movable friction clutch member into engagement with the opposed member to store energy within said connection during the transmission of power from the motor to the driven shaft.

5. Mechanism of the class described including a motor shaft, a driven shaft, coöperating means upon the shafts for operatively connecting the same, a friction member fixedly connected to the motor shaft, a friction member loosely mounted upon the driven shaft, an elastic connection between the said loose member and the driven shaft, means for holding said connection inactive while under stress, means for successively placing the shaft in operative relation and releasing the connection to actuate the driven shaft, and means for placing the friction members in engagement to store energy within the spring connection during the rotation of the motor shaft under its own power.

6. Mechanism of the class described including a motor shaft, a driven shaft, a friction member fixedly secured to the motor shaft, a friction member loosely mounted on the driven shaft, a spring constituting the sole power transmitting connection between the loose member and the driven shaft, means operated by said members for storing energy within the connection, and means for placing the shafts in operative connection and for releasing the spring connection to actuate the motor shaft.

7. Mechanism of the class described including a motor shaft, a driven shaft, a friction member secured to the motor shaft, a friction member loosely mounted on the driven shaft, a spring constituting the sole power transmitting connection between the loose member and the driven shaft, means for holding said connection inactive while under stress, means for shifting the driven shaft and the holding means successively to place the shafts in operative relation and to release the spring to actuate the shafts, and means for shifting the movable member to transmit motion from the motor shaft to the driven shaft through the spring and to store energy within said spring.

8. Mechanism of the class described including a driving friction member, a driven friction member, a driven shaft mounted for rotation within said driven member, a spring constituting the sole connection between said driven member and shaft, a friction device for holding the driven member against rotation in one direction, means engaging said movable member to hold the shaft against rotation in the opposite direction, means for successively placing the shaft in operative relation with the driving member and releasing said shaft from the movable member to release the spring and actuate the driving member from the shaft, and means for shifting the movable member into engagement with the driving member to store energy within the spring during the rotation of said members.

In testimony that I claim the foregoing as my own, I have hereto affixed my signature in the presence of two witnesses.

EDGAR U. G. REAGAN.

Witnesses:
F. B. OCHSENREITER,
HERBERT D. LAWSON.